(12) United States Patent
Kontos et al.

(10) Patent No.: US 8,679,356 B2
(45) Date of Patent: Mar. 25, 2014

(54) MASK SYSTEM AND METHOD OF PATTERNING MAGNETIC MEDIA

(75) Inventors: Alexander C. Kontos, Beverly, MA (US); Frank Sinclair, Quincy, MA (US); Anthony Renau, West Newbury, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 33 days.

(21) Appl. No.: 13/111,657

(22) Filed: May 19, 2011

(65) Prior Publication Data

US 2012/0292285 A1 Nov. 22, 2012

(51) Int. Cl.
*B44C 1/22* (2006.01)

(52) U.S. Cl.
USPC ............... 216/22; 216/47; 216/62; 438/766

(58) Field of Classification Search
USPC ............ 216/22, 41, 58, 62, 75, 87, 47, 72.75; 438/736, 766, 710, 785
See application file for complete search history.

(56) References Cited

U.S. PATENT DOCUMENTS

| | | |
|---|---|---|
| 6,331,364 B1 | 12/2001 | Baglin et al. |
| 6,864,042 B1 | 3/2005 | Kuo et al. |
| 2009/0001047 A1 | 1/2009 | Pelhos |
| 2009/0117409 A1 | 5/2009 | Lee et al. |
| 2009/0191711 A1* | 7/2009 | Rui et al. ............... 438/695 |
| 2009/0213497 A1 | 8/2009 | Ono et al. |
| 2009/0244777 A1 | 10/2009 | Shimizu et al. |
| 2009/0311363 A1* | 12/2009 | Dobisz et al. ............. 425/470 |
| 2010/0053813 A1* | 3/2010 | Fukushima et al. ........ 360/131 |
| 2010/0149680 A1 | 6/2010 | Ishibashi et al. |
| 2010/0258431 A1 | 10/2010 | Moffatt et al. |
| 2010/0261040 A1 | 10/2010 | Foad et al. |
| 2012/0021607 A1* | 1/2012 | Huang et al. ............. 438/703 |

FOREIGN PATENT DOCUMENTS

| | | |
|---|---|---|
| JP | 2010140541 A | 6/2010 |
| WO | 2008069082 A1 | 6/2008 |
| WO | 2010048030 A2 | 4/2010 |
| WO | 2010098993 A2 | 9/2010 |

OTHER PUBLICATIONS

M.S. Martin-Gonzalez et al. Nano-patterning of perpendicular magnetic recording media by low-energy implantation of chemically reactive ions, J. of Magnetism and Magnetic Materials, 2010, pp. 2762-2768, Elsevier.
C. Chappert et al., Planar Patterned Magnetic Media Obtained by Ion Irradiation, Science, Jun. 19, 1998, vol. 280, pp. 1919-1922.

* cited by examiner

*Primary Examiner* — Lan Vinh

(57) ABSTRACT

A method of patterning a substrate, comprises patterning a photoresist layer disposed on the substrate using imprint lithography and etching exposed portions of a hard mask layer disposed between the patterned photoresist layer and the substrate. The method may also comprise implanting ions into a magnetic layer in the substrate while the etched hard mask layer is disposed thereon.

23 Claims, 4 Drawing Sheets

MASK SYSTEM AND METHOD OF PATTERNING MAGNETIC MEDIA

BACKGROUND OF THE INVENTION

1. Field of the Invention

Embodiments relate to the field of magnetic storage. More particularly, the present invention relates to a method, system and structure for patterning a magnetic substrate using ion implantation.

2. Discussion of Related Art

Conventional magnetic storage media may be fabricated using blanket magnetic layers that are written and read using a magnetic device to create and/or read small magnetic domains within the layer. As storage density scales to the Tbit/in$^2$ range, microstructural limitations in blanket magnetic films, such as grain size effects, may limit the ability to magnetically write features of the size required to meet the storage density target. As an alternative to conventional magnetic storage coatings, bit patterned magnetic media have been studied in recent years.

In bit patterned magnetic recording media, individual islands of magnetic material may be isolated from one another, such that each island may represent one magnetic bit. This allows the bit boundary to be precisely defined by the physical edges of the patterned magnetic islands.

One proposed candidate for fabricating patterned magnetic recording media is the so-called nano-imprint lithography process. FIGS. 1a-e depict one implementation of nano-imprint lithography for patterning a magnetic layer. In nano-imprint lithography an imprint mold 12 is placed in contact with an imprintable medium 14 that is deposited on a magnetic layer 16, which in turn may be disposed on a substrate 18, as depicted in FIG. 1a. The imprintable medium may be a resist that flows under pressure exerted by the mold 12. In some cases, the resist may be heated in order to facilitate the imprint process. After release (FIG. 1b), the residual shape of the resist layer may resemble a negative relief of the mold 12. Any residual resist remaining in troughs may be removed (FIG. 1c), followed by a conventional etch step (FIG. 1d) to pattern the magnetic layer 16 by removing magnetic material in the exposed troughs. Subsequently, resist may be removed (FIG. 1e) leaving a patterned magnetic media structure comprising isolated structures, which may be planarized, if desired. In addition to the aforementioned nano-imprint lithography process, techniques have been developed in which self assembling block copolymers are used in conjunction with nano-imprint lithography. For example, nano-imprint lithography may be used to write a matrix of features on a surface which serves as a template of islands on which self-assembling block copolymers align. This process has been reported to yield more robust patterning of small features over a large area. It is to be noted that the above processes are typically performed in two dimensions within a plane of the substrate, resulting in a two dimensional array of isolated islands.

Although the nano-imprint lithography and related processes can in principle produce small isolated structures on the scale of tens of nm in lateral dimension, several challenges to its successful implementation remain. The aforementioned process steps involve removal of magnetic material, which may redeposit in other regions of the substrate, which may degrade planarity and may lead to damage of the sidewalls of bits during etch removal. In addition, it may be desirable or necessary to planarize the substrate after the isolated islands of magnetic material are created, adding to process complexity.

Other efforts to produce bit patterned magnetic structures have included the use of ion implantation to implant regions of a magnetic material to alter the properties in the implanted region and create isolated magnetic regions. By using a stencil mask or patterned photoresist, a pattern of ion implanted regions having the mask or photoresist pattern can be introduced into the magnetic layer. The ion implanted regions may have their original magnetic properties disrupted. This pattern of implantation can serve to separate one unimplanted region from other unimplanted regions, thereby forming isolated magnetic regions. However, the stencil mask efforts have involved relatively large bit patterns, where the lateral feature size is on the order of one micrometer, which is not suitable for future storage density requirements. The use of photoresist as a mask for bit patterning using implantation has also been investigated. However, photoresist materials generally exhibit less than optimal stability when subject to ion implantation. This instability may limit the ability to pattern very small dimensions using photoresist as an implantation mask.

In view of the above, it will be appreciated that there is a need to improve patterning technologies to create patterned magnetic media for high density storage.

SUMMARY OF THE INVENTION

Embodiments of the present invention are directed to methods and systems for improving patterning a substrate, in particular, by patterning a magnetic medium. In one embodiment, a method of patterning a substrate comprises patterning a resist layer disposed on the substrate using imprint lithography and etching exposed portions of a hard mask layer disposed between the patterned resist layer and the substrate. The method further comprises implanting ions into a magnetic layer in the substrate while the etched hard mask layer is disposed thereon.

In some embodiments, the nano-imprint lithography may be used in conjunction with self-assembly block copolymers.

In another embodiment, a method of fabricating a magnetic bit patterned media comprises providing a substrate comprising a base region and a magnetic layer disposed thereon. The method also includes forming a patterning stack on the substrate, the patterning stack comprising a resist layer disposed on a hardmask layer, and forming a pattern of resist features using a lithographic process. The method also includes patterning the hardmask using the resist features and implanting ions into the magnetic layer while the patterned hard mask is disposed thereon.

DESCRIPTION OF EMBODIMENTS

Figure 1:
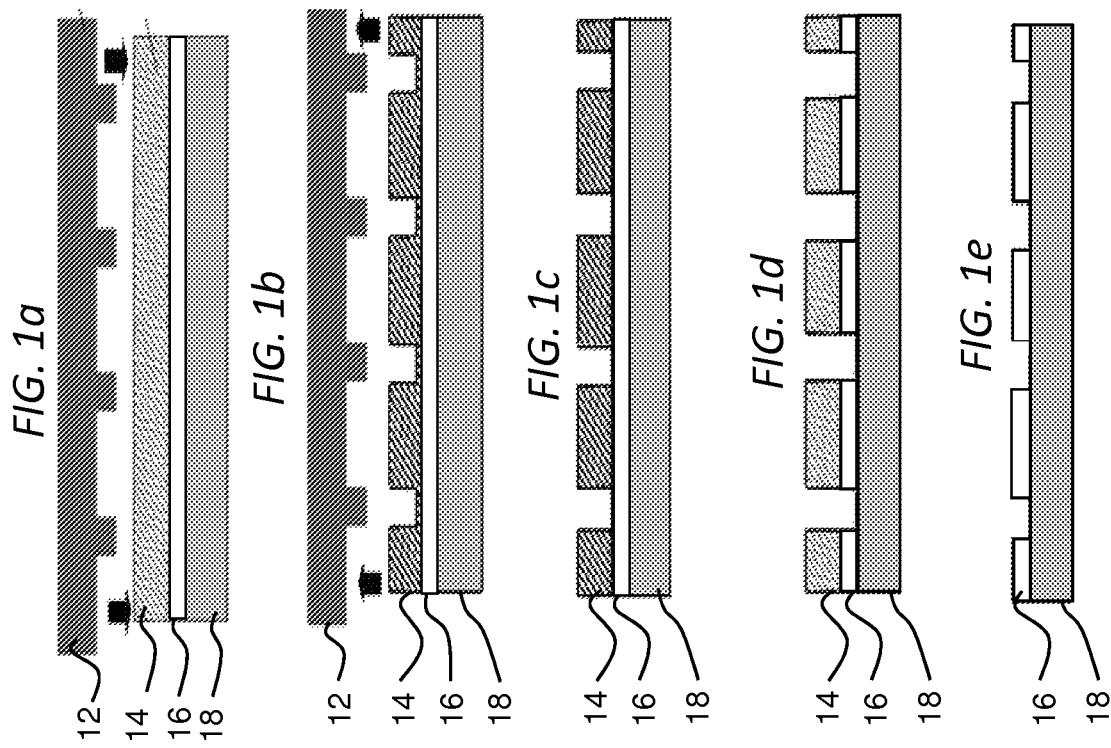
FIGS. 1a-1e illustrate steps of a known nano-imprint lithographic process.

The present invention will now be described more fully hereinafter with reference to the accompanying drawings, in which preferred embodiments of the invention are shown.

This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

To solve the deficiencies associated with the methods noted above, novel and inventive techniques and systems for patterning a substrate are introduced. In particular, the present disclosure focuses on techniques involving ion implantation processes for patterning magnetic media. The methods disclosed herein may be used in conjunction with lithography processes including nano-imprint patterning. However, those of ordinary skill in the art will recognize that the techniques disclosed herein are not limited to use in conjunction with any particular lithography or any range of patterned feature dimensions.

The embodiments are also described as techniques using ion based substrate processing systems. However, those of ordinary skill in the art will recognize that other types of sub-atomic, atomic, or molecular particle based substrate processing systems, including plasma processing, as well as beam line ion implantation systems used to produce such particles, are within the scope of the present disclosure.

In various embodiments, processes for patterning magnetic media involve implantation of a blanket magnetic layer using energetic particles, such as ions. The blanket magnetic layer may be patterned using a patterned hard mask layer, such as a high atomic weight layer. In various embodiments, the patterned hard mask layer may comprise an array, such as a two dimensional array of islands, which is disposed on the magnetic layer to be patterned. The mass, energy, and dose of ions may be tailored to alter the magnetic properties of the exposed areas of the magnetic layer that lie between the mask islands. In various embodiments, the patterned mask features are arranged to preserve the magnetic properties of the regions of the magnetic layer underlying the mask features. In this manner, an array of isolated magnetic features can be formed within a continuous layer without the need to remove magnetic material or planarize the patterned magnetic array.

Figure 2:
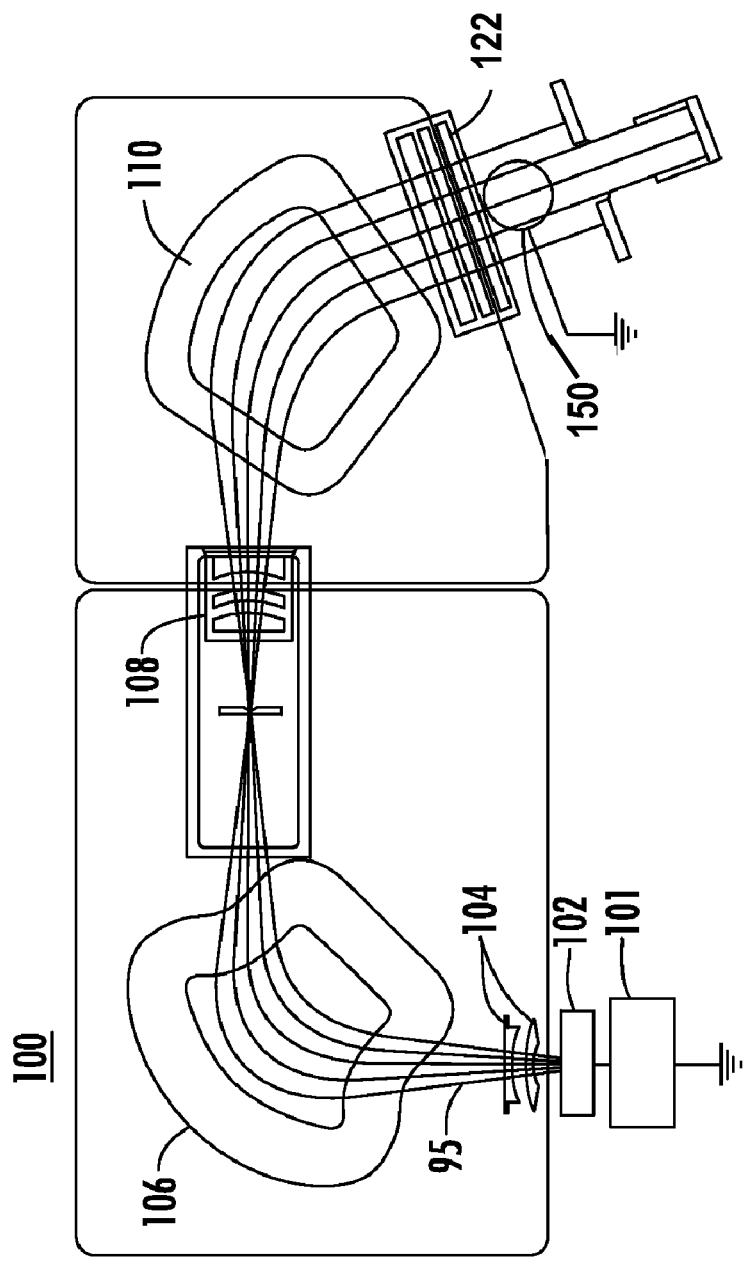
FIG. 2 is a schematic depiction of a conventional ion beam implantation system.

In various embodiments, ion implantation of a magnetic medium may be performed using a patterned hard mask that is formed using conventional nano-imprint lithography or using nano-imprint lithography in conjunction with self-assembly of block copolymers. FIG. 2 depicts a block diagram of an ion implanter that illustrates general features of a beam line ion implanter that may be used in embodiments of the present invention. System 100 includes an ion source chamber 102. A power supply 101 supplies the required energy to source 102 which is configured to generate ions of a particular species. The generated ions are extracted from the source through a series of electrodes 104 (extraction electrodes) and formed into a beam 95 which passes through a mass analyzer magnet 106. The mass analyzer is configured with a particular magnetic field such that only the ions with a desired mass-to-charge ratio are able to travel through the analyzer. Ions of the desired species pass through deceleration stage 108 to corrector magnet 110. Corrector magnet 110 is energized to deflect ion beamlets in accordance with the strength and direction of the applied magnetic field to provide a beam targeted toward a work piece or substrate 150. The ions lose energy when they collide with electrons and nuclei in the substrate and come to rest at a desired depth within the substrate based on the acceleration energy. Among other effects, ions may change the microstructure, composition, and local bonding of atoms within a region of the substrate in which the ions are implanted or in nearby regions which are altered by the results of the implantation.

Figure 3:
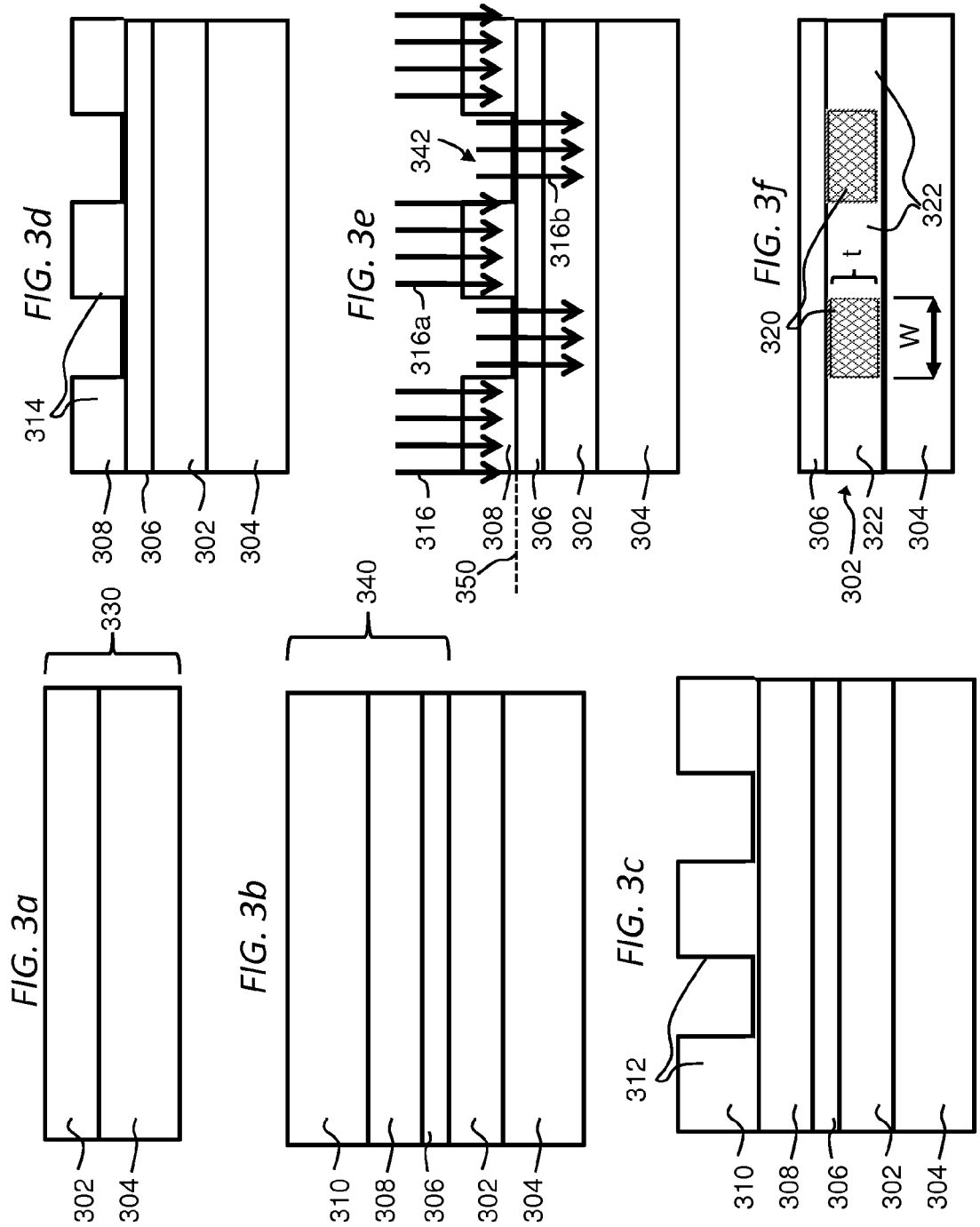
FIGS. 3a-f depict in cross-sectional side view exemplary steps involved in an embodiment of substrate patterning.

FIGS. 3a-3f depict an exemplary structure and method for forming bit patterned media consistent with embodiments of this disclosure. In FIG. 3a, a substrate stack 330 includes a magnetic layer 302 disposed on a substrate base 304. Magnetic layer 302 may comprise any magnetic material, such as a ferromagnetic layer that is suitable for high density magnetic recording. For example, in some embodiments, layer 302 may be a cobalt alloy material. The thickness of layer 302 may vary from about 5 nm to 20 nm in various embodiments. Although not explicitly shown, layer 302 may include sub-layer(s), for example, a seed sub-layer disposed between a top magnetic sub-layer and the base region 304, as known in the art. The seed layer may or may not itself comprise a magnetic material.

In FIG. 3b a patterning stack 340 is formed on substrate stack 330. In various embodiments, patterning stack 340 includes an overcoat layer 306 disposed directly on magnetic layer 302, an implantation hard mask layer 308, and a top resist layer 310. However, in some embodiments, overcoat layer 306 may be omitted from patterning stack 340. As detailed below, patterning stack 340 may be used to form a bit patterned magnetic medium that comprises a continuous layer of material, such as a cobalt alloy, which nevertheless contains isolated magnetic bits. In various embodiments, the implantation hard mask 308 may serve various functions, including providing a well defined mask having straight sidewalls to provide accurate patterning, providing resistance to erosion of mask features during sputtering and implantation processes, providing ion screening to protect underlying magnetic bits, and providing a conveniently removable medium wherein the magnetic properties of layer 302 are not altered during the removal of the hard mask layer 308.

In various embodiments, hard mask layer 308 may, but need not be, be a relatively high atomic weight material as compared to photoresist. In some embodiments, hard mask layer 308 may comprise a single layer, while in other embodiments, hard mask layer 308 may be multiple layers. For example layer 308 may be one or more than one layer in which one or more of the layers is W, Mo, Ta, or a similar refractory metal, or may be another metal, a metal nitride, a silicon nitride, carbon, or other compound. More generally, the hard mask layer 308 may comprise a layer or layers whose average specific gravity, is greater than that of photoresist. This generally confers a higher stopping power to incident ions as compared to materials of lower specific gravity. Thus, a material such as silicon nitride whose specific gravity is about 3.2, or a refractory metal having a specific gravity in the range of 8-20, for example, may be much more effective in stopping many different ions as compared to typical photoresists, which have specific gravity in the range of 1.

Figure 4:
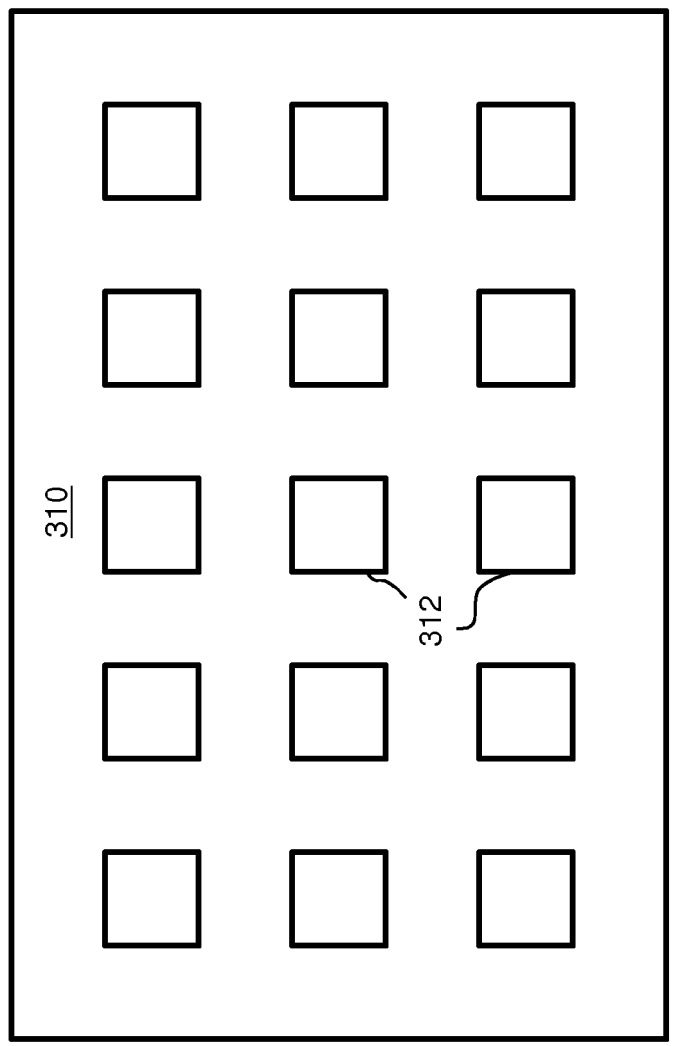
FIG. 4 depicts in plan view an exemplary bit patterned magnetic medium.

Patterning of layer 302 using stack 340 may be accomplished according to the steps outlined in FIGS. 3c-f. In the step of FIG. 3c, resist layer 310 is patterned such that relief features 312 are formed. According to various embodiments, patterning may take place in two dimensions within a plane of substrate 304, such that features 312 are isolated islands, as illustrated in FIG. 4.

In some embodiments, nano-imprint lithography or nano-imprint lithography in conjunction with self-assembly block copolymers may be used to form resist relief features 312. The nano-imprint mold may be designed according to a desired pattern to be transferred to resist layer 310. An advantage of using nano-imprint lithography and/or self-assembly block copolymers is the ability to easily form very small arrays of features in a size range that is problematic for conventional optical lithography. For example, a nano-imprint lithography mold may be formed using techniques such as electron beam lithography, with or without self-assembly block copolymers which can write features into the mold whose lateral size is on the order of several nanometers or tens or nanometers. The nano-imprint mold can then be reused many times to print whole substrates or macroscopic regions of a substrate in a single imprint step. In some embodiments, an array pitch (center to center distance between adjacent features in an array) of about 20-25 nm may be produced. Accordingly, an isolated array of resist islands 312 having dimensions suitable for terabit/in$^2$ storage density may be formed on substrate 330.

Turning to FIG. 3d, in a subsequent step, the pattern of resist features 312 may be transferred to the underlying implantation hard mask layer 308, forming mask features 314. In some embodiments, patterning of layer 308 may be performed using known processes, such as reactive ion etching. As noted above, in some embodiments, hard mask layer 308 may comprise a metallic material, while in other embodiments mask layer 308 may be an oxide, nitride, or other material such as carbon or a multi-layer combination of materials.

Figure 5:
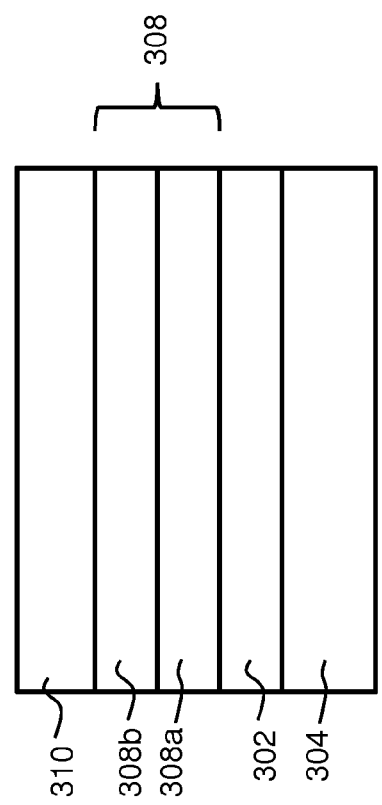
FIG. 5 depicts an embodiment of a patterning stack that includes a two-layer hard mask system.

FIG. 5 depicts an embodiment of a two-layer mask 308 having a top layer 308a and bottom layer 308b. In some embodiments, top layer 308a may be a spin-on glass material, and bottom layer 308b may be carbon. In one embodiment, the layer thickness of layers 308a and 308b may be about 30 nm. This arrangement of two hard mask layers may facilitate patterning of thicker hard mask layers, which may be employed for very dense patterning that requires thinner resist. Because the etch selectivity between resist and underlying hard mask may not be very strong, it may be unfeasible to employ a thick hard mask system that has only a single layer, since the masking resist features may etch away before the hard mask is etched through. In addition, use of the dual layer hard mask may provide more vertical sidewalls during the etch process. In contrast, the use of spin-on glass as a first layer 308a that is disposed on a carbon layer 308b, may provide better etch selectivity that facilitates transfer of the pattern in the resist layer 310 before the resist is etched away.

After patterning of implantation hard mask layer 308, implantation of the patterned hard mask may be performed, as shown in FIG. 3e. In this step, the substrate may be placed in a beam line implanter as described above, or may placed in other implantation apparatus, such as a plasma immersion implantation system. In accordance with some embodiments, the ions 316 may be provided at a uniform angle of incidence. For example, the ions 316 may be provided at a normal incidence to a plane 350 of the substrate, as depicted in FIG. 3e. Ions 316 may be provided as a beam that strikes patterned mask features 314 as well as troughs 342 in between the mask features at the same time. Ions 316a, which impact implantation mask features 314, may be attenuated by the mask features, such that the ions do not penetrate to underlying regions 306 or 302. In contrast, ions 316b, which impinge on the substrate in trough regions 342, may penetrate into magnetic layer 302.

In a subsequent step, illustrated in FIG. 3f, implantation hard mask 308 may be removed, leaving a planar substrate configuration, in which overcoat layer 306 may remain, or may be removed during the hard mask removal. As further depicted in FIG. 3f, layer 302 may comprise unaltered magnetic regions 322, as well as implanted regions 320. In various embodiments, the implanted regions 320 are sufficiently impacted by ion bombardment as to alter their magnetic properties, thereby producing a structure in layer 302 that comprises isolated magnetic bits 322 separated by regions 320 having altered magnetic properties. In some embodiments, the ions may be an inert gas, carbon, nitrogen, silicon, phosphorous, arsenic, chromium, Ge, As or other species. The ion energy and ion flux may be tailored according to the ion species to produce the desired alteration in implanted regions 320.

By use of the appropriate implantation hard mask material in conjunction with nano-imprint lithography and/or a self-assembly block copolymer process, nanometer scale magnetic bits 322 may be precisely patterned into arrays having pitches as small as about 10 nm. In some embodiments, a high atomic weight material may be chosen for mask layer 308, such that the thickness of implantation hard mask features 314 can be minimized. By using a relatively higher atomic weight material in the implantation mask, the layer thickness sufficient to stop incident ions 316a within regions 314 may be minimized. In this manner, the lateral dimensions W of implant region 320 (and thereby region 322) can be more precisely controlled, since shadowing and other ion scattering effects from features 314 may be minimized during implantation due to the decreased height of such mask features.

In some embodiments, the entire thickness of layer 302 may be implanted by ions 316b, while in other embodiments, the layer may be partially implanted. In the latter cases, the implantation depth t in layer 322 may be arranged to provide an altered region 320 of sufficient thickness to provide isolated magnetic bits 322 that are not coupled through any residual magnetic layer underlying the implanted region 320.

In various embodiments, the altered regions 320 may be non-magnetic after the implantation step. However, in other embodiments, the altered regions need not become non-magnetic. For example, regions 322 may show a strong magnetocrystalline anisotropy, and a wide hysteresis loop, while regions 320 may show little magnetocrystalline anisotropy and a narrow hysteresis loop, thereby effectively making an array of isolated magnetic bits 322 that can be read and/or written by the appropriate applied magnetic fields.

It will be appreciated that the choice of implantation hard mask material and thickness may be tailored to the thickness and composition of the magnetic layer to be implanted. Thus, for implantation of a 10 nm thick CoCrPt alloy, the ions 316 may be provided with the proper energy, dose, and mass for altering the 10 nm alloy layer in the trough regions 342, which in turn, corresponds to a hard mask thickness/material combination that is sufficient to stop ions 316a within the hard mask features 314. If the chosen hard mask material 314 has comparable ion stopping power to the CoCrPt alloy, an effective thickness for the hard mask material may be about 10 nm or greater. In this manner, most or all of the implanting ions 316a may be attenuated within the hard mask features 314, while in the unmasked regions 342 (neglecting attenuation by optional layer 306, which may be a thin carbon layer providing little attenuation), the implanting ions 316b and their resultant damage may extend through the entire thickness of the magnetic film 302.

The methods and structures for forming bit patterned magnetic media of the present embodiments provide advantages over known processes both in process simplification and in facilitating scaling to very small dimensions. In contrast to known methods of bit patterning using resist to directly pattern a magnetic layer, the present embodiments take advantage of the simplicity of nano-imprint lithography while avoiding the disadvantages of direct resist patterning of a magnetic layer. As noted above, the present embodiments do not require removal of material from a magnetic layer as is the case in proposed schemes in which resist is used to pattern and etch a magnetic layer to form isolated magnetic bits. Moreover, the present embodiments present clear advantages over processes using resist as an implant mask. In the first place, resists typically comprise low-Z atoms including hydrogen, carbon, oxygen, and nitrogen, which may have poor stopping power for many ions, thereby requiring a thick layer to provide adequate masking of an intended magnetic bit region underneath the resist. However, thicker patterned implant mask features may create poorer definition of magnetic bits due to the geometrical effects discussed previously.

Moreover, the erosion rate of resist during processing, such as the implantation step, may be too high to preserve the intended bit dimensions. As an example, the present inventors have examined the behavior of 100 nm wide resist features during an exemplary ion implantation step that may be used for bit patterning. Although the resist islands were initially 72 nm thick, after the implantation step, the thickness was reduced to 34 nm. This observed rapid resist erosion demonstrates that, even if the resist thickness is initially adequate to screen ions, during implantation, the thickness may decrease so rapidly as to permit ions to pass into the underlying magnetic layer. In addition, the average resist feature width was observed to shrink substantially after ion bombardment, with a resultant tapered sidewall profile. This tapered sidewall structure may lead to a lateral gradient of ions implanted into the magnetic regions underlying the sloped sidewalls, leading to poor definition of the borders of the magnetic bits.

In contrast, as previously noted, by providing a higher atomic weight material as an implantation hard mask, the present embodiments facilitate use of thinner masks that facilitate better pattern definition using ion implantation. Moreover, the sputter etch rate during implantation using such higher-Z materials may be reduced such that the overall lateral feature or island width in the mask features is preserved during implantation. Furthermore, unlike patterned resist features, the hard mask materials of the present embodiments, such as metals or nitrides or a multi-layer system, may be more suited to forming vertical sidewalls during the etch step used to create the patterned implantation mask. In some embodiments, the etch chemistry in a reactive ion etching system may be tailored for the exact material system and feature height to produce a near-zero angle sidewall.

In addition to facilitating better bit pattern definition, the present embodiments provide a convenient process for forming a planarized bit pattern structure. Since no magnetic layer material need be removed, redepositing of metallic material on the substrate in unwanted areas is avoided. Furthermore, by providing an overcoat between the implantation mask layer and magnetic layer, removal of the patterned implantation mask may be facilitated. For example, in the case of metallic masks, a wet chemical metal etchant or reactive ion etching process may be used that does is highly selective between the mask material and the overcoat layer, thereby protecting the metallic magnetic layer from attack. In one particular example, the overcoat may comprise a carbon material such as a permanent overcoat material that may be used for protecting the magnetic layer, thereby providing a dual purpose for the overcoat.

In summary, the present embodiments provide novel and inventive methods for forming magnetic bit patterned media. By appropriate choice of implantation hardmask material, thickness, ion energy, dose, species, angles of incidence, and sidewall etch chemistry, an improved process for forming nano-scale isolated magnetic bits may be obtained.

The present invention is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the subject matter of the present disclosure should be construed in view of the full breadth and spirit of the present disclosure as described herein.

What is claimed is:

1. A method of patterning a magnetic media substrate, comprising:
    patterning a resist layer disposed on the substrate using lithography;
    patterning the hard mask layer by etching exposed portions of a hard mask layer disposed between the patterned resist layer and the substrate, such that the hard mask layer is substantially exposed;
    implanting ions into a magnetic layer in the substrate while the etched hard mask layer is disposed thereon, wherein the hard mask layer comprises at least two different non-metallic layers; and
    removing the hard mask layer after the ions are implanted into the magnetic layer.

2. The method of claim 1, comprising implanting the ions into the substrate to transform exposed regions of the magnetic layer into non-magnetic regions.

3. The method of claim 1, wherein the hard mask layer comprises a material having a higher ion stopping power than photoresist.

4. The method of claim 1, wherein a width of a hard mask feature is about 5 nm to about 90 nm.

5. The method of claim 1, comprising implanting ions into an entire thickness of exposed regions of the magnetic layer.

6. The method of claim 1, wherein the hard mask layer comprises at least one material, the at least one material comprising one or more of tungsten, molybdenum, chromium, tantalum, carbon, and silicon nitride.

7. The method of claim 1, wherein the at least two different non-metallic layers comprises spin-on glass layer and a carbon layer.

8. The method of claim 1, comprising implanting the ions into the substrate to alter magnetic properties of exposed regions of the magnetic layer.

9. The method of claim 8, wherein magnetocrystalline anisotropy in the exposed magnetic regions is destroyed.

10. The method of claim 1, comprising selectively removing the etched hard mask layer after the implanting the ions.

11. The method of claim 10, wherein the substrate comprises an overcoat disposed between the hard mask layer and the magnetic layer, and wherein the overcoat remains intact after the selectively removing the etched hard mask layer.

12. The method of claim 1, comprising etching the hard mask layer to form three dimensional hard mask features configured to screen the ions from underlying portions of the substrate.

13. The method of claim 12, wherein regions of the magnetic layer underlying the hard mask features remain magnetic after the implanting.

14. The method of claim 12, wherein the three dimensional hard mask features comprise an array of features having a pitch of about 5 nm to about 100 nm.

15. The method of claim 12, comprising forming a two dimensional array of features in the hard mask layer.

16. A method of fabricating a magnetic bit patterned medium, comprising:
providing a substrate comprising a base region and a magnetic layer disposed thereon;
forming a patterning stack on the substrate, the patterning stack comprising a resist layer disposed on a hard mask layer, wherein the hard mask layer comprises at least two different non-metallic layers;
forming a pattern of resist features using a lithographic process;
patterning the hard mask layer using the resist features, such that the hard mask layer is substantially exposed;
implanting ions into the magnetic layer while the patterned hard mask layer is disposed thereon; and
removing the hard mask layer after the ions are implanted into the magnetic layer.

17. The method of claim 16, comprising implanting the ions into the substrate to transform exposed regions of the magnetic layer into non-magnetic regions.

18. The method of claim 16, comprising implanting the ions into the substrate to alter magnetic properties of exposed regions of the magnetic layer.

19. The method of claim 16, wherein regions of the magnetic layer underlying the hard mask features remain magnetic after the implanting.

20. The method of claim 16, wherein the hard mask layer comprises a material having a higher ion stopping power than photoresist.

21. The method of claim 16, wherein the at least two different non-metallic layers comprises spin-on glass layer and a carbon layer.

22. The method of claim 16, wherein the lithographic process comprises a nano-imprint lithography process.

23. The method of claim 22, further comprising using a self-assembling block copolymer process in conjunction with the nano-imprint process.

* * * * *